(12) United States Patent
Oelsch (10) Patent No.: US 6,948,852 B2
(45) Date of Patent: Sep. 27, 2005

(54) HYDRODYNAMIC BEARING, SPINDLE MOTOR AND HARD DISK DRIVE

(75) Inventor: Juergen Oelsch, Hohenroth (DE)

(73) Assignee: Minebea Co., Ltd., Nagano (JP)

( * ) Notice: Subject to any disclaimer, the term of this patent is extended or adjusted under 35 U.S.C. 154(b) by 125 days.

(21) Appl. No.: 10/403,437

(22) Filed: Mar. 31, 2003

(65) Prior Publication Data

US 2004/0008910 A1 Jan. 15, 2004

(30) Foreign Application Priority Data

Jul. 15, 2002 (DE) .......................................... 102 31 962

(51) Int. Cl.[7] .............................................. F16C 32/06
(52) U.S. Cl. ........................ 384/100; 384/107; 384/114
(58) Field of Search ................................. 384/100, 107, 384/119, 124, 132; 310/90; 360/99.08, 98.07

(56) References Cited

U.S. PATENT DOCUMENTS

| | | | | |
|---|---|---|---|---|
| 4,254,961 A | * | 3/1981 | Fersht et al. ................ | 384/100 |
| 5,067,528 A | * | 11/1991 | Titcomb et al. .............. | 141/4 |
| 5,540,504 A | * | 7/1996 | Cordova et al. ............ | 384/100 |
| 5,558,443 A | * | 9/1996 | Zang .......................... | 384/112 |
| 5,667,309 A | | 9/1997 | Nose | |
| 5,876,124 A | * | 3/1999 | Zang et al. ................. | 384/107 |
| 6,236,129 B1 | * | 5/2001 | Yamashita ................... | 310/90 |

FOREIGN PATENT DOCUMENTS

| | | |
|---|---|---|
| EP | 0 117 873 A1 | 9/1983 |
| JP | 2001012458 A | 1/2001 |
| WO | WO 00/52350 | 9/2000 |
| WO | WO 02/10602 A1 | 2/2002 |

* cited by examiner

*Primary Examiner*—Thomas R. Hannon
(74) *Attorney, Agent, or Firm*—Joel Lutzker, Esq.; Anna Vishev, Esq.; Schulte Roth & Zabel (57) ABSTRACT

A hydrodynamic bearing having a shaft (10) and a bearing sleeve (12), which encloses the shaft with a slight radial clearance forming a concentric bearing gap. An equalizing volume cavity (20) is formed at at least one end of the bearing. At least one micro-passage (26) connects the bearing gap via appropriate openings with the equalizing volume cavity (20). Bearing fluid completely fills the bearing gap (24) and the micro-passage (26) and at least partially fills the equalizing volume cavity (20). The bearing fluid forms a continuous fluid film between the bearing gap (24) and the equalizing volume cavity (20).

16 Claims, 7 Drawing Sheets

HYDRODYNAMIC BEARING, SPINDLE MOTOR AND HARD DISK DRIVE

CROSS-REFERENCE TO RELATED APPLICATION

This application claims all rights of priority to German Patent Application Serial No. DE 102 31 962.6, filed Jul. 15, 2002 (pending).

BACKGROUND

The invention relates to a hydrodynamic bearing for use in a spindle motor of a hard disk drive.

A spindle motor for a hard disk drive generally consists of a rotating component, a rotor, having an annular permanent magnet, and a stationary component, a stator, having a stator stack wound with coils, wherein the rotor is equipped with an appropriate rotary bearing to enable rotor's rotation with respect to the stator.

Alongside roller bearings which have been in use for a long period of time, hydrodynamic bearings are now finding increasing application. A hydrodynamic bearing is an improvement on a journal bearing which consists of a bearing sleeve having a cylindrical inner bearing surface and a shaft having a cylindrical outer bearing surface set into the sleeve. The outer diameter of the shaft is only slightly smaller than the inner diameter of the sleeve, thus creating a radial bearing gap between the two bearing surfaces. The bearing gap is filled with a lubricant, preferably oil, forming a continuous capillary film.

To prevent bearing oil from escaping from the hydrodynamic bearing, one end face of the bearing sleeve is sealed with an airtight seal. At the opposite open end, a concentric area, having, for example, a conical contact surface, can be formed between the shaft and the inner surface of the bearing sleeve. The resulting tapered area functions as both a lubricant reservoir and an oil expansion volume. This tapered area also takes on the function of sealing the bearing. Under the influence of capillary forces, the oil in the area between the shaft and the conical surface of the bearing sleeve forms a stable, continuous liquid film. Therefore, such a seal is typically called a capillary seal.

Such a solution is described in U.S. Pat. No. 5,667,309. Here, a bearing sleeve is disclosed featuring a conical area at its top open end, wherein a concentric tapered area with a rotationally symmetric cross-section is created between the shaft and the bearing sleeve. Bearing oil is contained at the lower end of this tapered area, in direct extension of the bearing gap. The quantity of the bearing oil is so calculated that despite the vaporization of the bearing oil, the bearing gap is always sufficiently filled with bearing oil and seizure of the bearing due to dry running is prevented. The "free" volume of the tapered area, i.e. the volume not filled with bearing fluid, functions as an expansion volume which can be at least partially filled with bearing fluid escaping from the bearing gap due to the fluid volume expansion with a rise in temperature. The concentric tapered area can thus be described as a kind of "overflow" volume which at the same time functions as a lubricant reservoir. The disadvantage of this, in itself simple, solution is that the sealing effect of this tapered area diminishes due to the outward extending cross-section and, as a consequence, its retention capability of the bearing oil also diminishes. Thus, the potential risk that oil is splashed out under axial shock again increases.

A further disadvantage of this known solution is that the useful length of the bearing, and consequently the bearing stiffness, is reduced by the overall axial length of the concentric tapered area conceived as the capillary seal. Here, the overall axial height of the seal cone and the related angle of inclination have to be adjusted to the filling volume and the viscosity of the bearing oil. Low viscosity bearing oils need a more acute angle and thus a larger overall length for the same filling volume.

For fluid bearings which have bearing sleeves with two open ends, the length available for the hydrodynamic radial bearing is reduced equally on both ends of the bearing sleeve. In addition the capability of the bearing to retain the bearing oil film deteriorates due to the cross-section widening at the ends of the bearing sleeve. Consequently, hydrodynamic bearings with a bearing sleeve sealed at one end are basically preferred due to their superior retention capability.

Another disadvantage arises from the fact that at a high rotational speed, considerable centrifugal forces are exerted on the bearing oil. These forces may cause the bearing oil in the tapered area to rise as high as the rim of the bearing sleeve thus increasing the risk of this oil being splashed out.

Since one of the most important criteria for the suitability of hydrodynamic bearings in hard disk drives is the lowest possible bearing power loss, particularly for deployment in portable devices, efforts are made to use bearing oils with the lowest possible viscosity. A capillary seal of the art described adapted to lower viscosity would consequently need a longer overall length which accordingly would have a negative impact on the effective bearing length. Dimensioning a hydrodynamic radial bearing with sufficient stiffness is consequently severely limited, and for very small-scale spindle motors no longer possible under certain circumstances.

SUMMARY

It is thus an object of the invention to provide a hydrodynamic bearing with an appropriate, non-contact seal which has the least possible power loss, extensive bearing stiffness and a long lifespan.

The invention provides a hydrodynamic bearing for a spindle motor having a shaft and a, preferably cylindrical, bearing sleeve which encompasses the shaft. The shaft may be connected to either a rotating or stationary component. Due to the slight difference in the diameters of the shaft and the cylindrical bearing sleeve, a bearing gap is formed there-between. The bearing gap is filled with a bearing fluid. In the area of the bearing gap, at least one radial bearing section is formed on the shaft and/or on the cylindrical bearing sleeve. As known in the art, the radial bearing section is formed particularly by providing a groove pattern on the inner surface of the bearing sleeve. In the hydrodynamic bearing according to the invention, an equalizing volume cavity is provided for the bearing fluid. The equalizing volume cavity functions as an expansion volume, into which the bearing fluid can expand when the fluid level increases as the temperature rises, and as a lubricant reservoir to replenish the vaporized bearing fluid.

According to the invention, the equalizing volume cavity is connected to the bearing gap by at least one connecting passage. In particular a micro-passage may be provided, which connects the bearing gap with an opening in the equalizing volume cavity. The equalizing volume cavity is distanced from the bearing gap in a radially outwards direction. The opening in the equalizing volume cavity can be realized as a single part opening or as a multi-part opening, taking the form of a passage shaped like an annular gap or one or more individual passages.

The equalizing volume cavity of the invention does not have to be formed along the useful bearing length in one part of the bearing gap, but rather it can be arranged outside the bearing gap and in particular moved radially outwards and connected to the bearing gap via the micro-passage. This means that the bearing sleeve can be formed along the entire length of the bearing with an unchanged diameter so that a bearing gap with a maximum useful length is created. The radial bearing sections of the hydrodynamic bearing can consequently be formed in close proximity to the respective bearing ends with a maximum interval between the two radial bearing sections, thus achieving optimum bearing stiffness.

Provision is made for the formation of an equalizing volume cavity, preferably at least at one end of the bearing sleeve.

Since the equalizing or storage volume cavity in the hydrodynamic bearing according to the invention is arranged outside of the bearing gap, preferably essentially perpendicular to the rotational axis, and features a cross-section tapering radially outwards and a radial outer end, where the connection to the micro-passage is found, this bearing is equally suitable for motors with a rotating or stationary shaft and/or a bearing sleeve open at each end. In one preferred embodiment of the invention, the equalizing volume cavity is placed in close proximity to the end of the bearing sleeve and runs essentially parallel to the micro-passage arranged beneath it.

The hydrodynamic bearing according to the invention can be used in electric motors and in particular in spindle motors for hard disk drives.

The equalizing or storage volume cavity is arranged and designed in such a way that the bearing fluid held within it is effectively restrained due to capillary forces at all times and in particular when exposed to axial shock.

Due to the centrifugal forces exerted on the bearing fluid, this effect is supported even more strongly for motors with a rotating bearing sleeve, so that even under radially effective accelerating forces, the spin-off of bearing fluid due to drop formation is practically excluded.

The arrangement of the equalizing volume cavity outside the bearing gap via the micro-passage, as well as the cavity design with its radially outwards tapering cross-section, effectively prevents any bearing oil from escaping so that, alongside an increase in lifespan, the functional reliability of the hydrodynamic bearing is significantly improved.

In one embodiment of the invention the micro-passage directly adjoins the radial bearing section in the bearing gap, whereas in another embodiment of the invention the micro-passage is indirectly connected to the radial bearing section via a part of the bearing gap. Important for both embodiments is that between the radial bearing section and the micro-passage, a capillary connection exists, so that the bearing fluid forms a continuous capillary film from the bearing gap via the micro-passage into the equalizing volume cavity.

The micro-passage is preferably formed fully or at least partly in the bearing sleeve and extends radially outwards from the inner diameter of the bearing sleeve, where the connection to the equalizing volume cavity takes place. In one particularly beneficial embodiment of the invention, the micro-passage is formed as a circumferential capillary annular gap starting from the inner diameter of the bearing sleeve which connects the radial bearing section or the bearing gap with the equalizing volume cavity.

The equalizing volume cavity is preferably arranged approximately parallel to the micro-passage in an area which forms an angle "α" with the rotational axis, wherein an angle of 90° is preferred to facilitate manufacture.

In one beneficial embodiment of the invention, the micro-passage is formed between one end of the bearing sleeve and an annular disk set at a short distance from this end and is parallel to it. Between the two opposing surfaces, an annular gap may thus be formed extending from the inner diameter of the bearing sleeve up to or close to its outer diameter. The distance between the end of the bearing sleeve and the annular disk is so dimensioned that a capillary film can be formed between the two.

The annular disk preferably has recesses on its outer perimeter which form a connection between the micro-passage and the equalizing volume cavity.

The equalizing volume cavity is preferably formed between this annular disk and a cap set at the end face of the bearing sleeve, wherein the cap, depending on the embodiment of the hydrodynamic bearing, can be an end plate, a cup enclosing the bearing sleeve or suchlike. Particularly preferred is an equalizing volume cavity formed as a concentric, rotationally symmetric cavity whose cross-section tapers radially from the inside towards the outside. The longitudinal axis of the V-shaped cross-section spans an intersecting plane which essentially runs perpendicular to the rotational axis.

The equalizing volume cavity and the micro-passage are connected at the outside edge area via the recesses found there, so that a continuous capillary film between the bearing gap and equalizing volume cavity arises via the micro-passage.

A shoulder can be provided on the shaft in the area of the bearing sleeve ends, which is at least partly overlapped by the annular disk and/or the cap in order to fix or secure the shaft in an axial direction. This radial overlapping provides additional protection against any bearing fluid splashing out of the bearing gap when the bearing is exposed to certain kinds of shock.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which:

FIG. 6b shows a view from above of a modification of the annular disk in FIG. 6a.

DETAILED DESCRIPTION

In all drawings, corresponding components are denoted with the same identification reference numbers.

Figure 1:
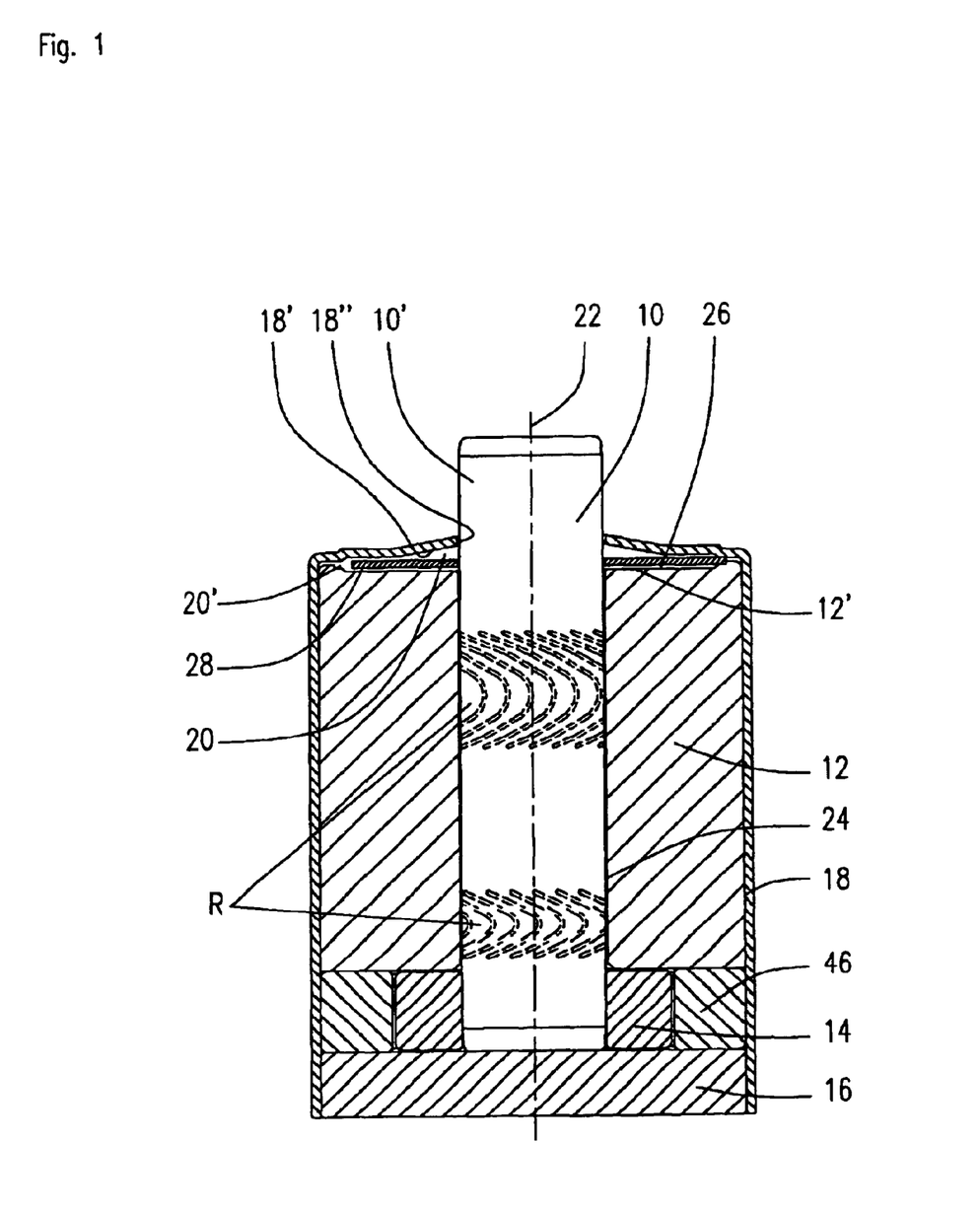
FIG. 1 shows a schematic longitudinal sectional view through a hydrodynamic bearing of a first embodiment of the invention.

The hydrodynamic bearing shown in FIG. 1 includes a shaft 10, which is accommodated in a cylindrical bearing sleeve 12. The shaft 10 features a thrust plate 14 at the end enclosed by the bearing sleeve. Bearing sleeve 12 is sealed at this end by a counter plate 16 which takes up the axial bearing load exerted on the shaft 10 via the thrust plate 14. The bearing sleeve 12 is set into a housing can 18 with the interposition of a spacer ring 46. With the aid of the spacer ring 46 the gap between the thrust plate 14 and counter plate 16 can be adjusted.

The end 10' of the shaft 10 protrudes from the bearing sleeve 12. The bearing sleeve 12 is closed at this end by the bottom 18' of the housing can 18 which features a central opening 18".

One end 12' of the bearing sleeve 12 is formed with an annular depression located radially towards the inside of the sleeve, such that a micro-passage 26 is formed between the end 12' and an annular disk 28. The annular disk 28 is set essentially parallel to the end 12'. The micro-passage 26 essentially runs perpendicular to the rotational axis 22 of the hydrodynamic bearing. The sleeve depression can have a depth of from 2–10 $\mu$m, preferably about 5 $\mu$m.

A bearing gap 24 is formed between the shaft 10 and the bearing sleeve 12, which is connected with the equalizing volume cavity 20 via the micro-passage 26 at the end 12' of the bearing sleeve 12 and at least one vent opening 20' in the annular disk 28, as explained in more detail below. The micro-passage 26 is formed by placing the annular disk 28 onto the end 12' of the bearing sleeve 12 with a very small clearance, such that a circumferential annular gap is created forming and maintaining a capillary connection between the bearing gap 24 and the equalizing volume cavity 20. The width of the micro-passage 26 corresponds approximately to the width of the bearing gap 24.

The equalizing volume cavity 20 is set between the annular disk 28 and the housing can 18 enclosing the bearing sleeve 12. In the embodiment illustrated in FIG. 1, the central opening 18" of the can bottom 18' is tapered upwards forming a concentric, tapered conical space, wherein the base of the cone at least partly overlaps at least one of the vent openings 20' set at the outside edge area of the annular disk, thus creating a connection between the equalizing volume cavity 20 and the micro-passage 26. Vent openings 20' are formed by appropriate recesses at the outside edge area of the annular disk 28, see FIGS. 6a and 6b.

In the illustrated embodiment, radial bearing sections R are preferably formed on the inner diameter of the bearing sleeve 12 by providing of groove patterns. In addition, in the area of the thrust plate 14 and the counter plate 16, axial bearing sections (not shown) can be formed using a known method. Since the equalizing volume cavity 20 and the micro-passage 26 connecting the bearing gap 24 with the equalizing volume cavity 20 are formed at the end 12' of the bearing sleeve 12, the entire length of the bearing sleeve 12 is available for one or more radial bearing sections R to be formed. In particular, two radial bearing sections R can be formed at the respective end sections of the bearing sleeve 12 with a maximum distance between them so that a maximum bearing stiffness can be achieved.

After the hydrodynamic bearing presented in the invention has been mounted, the bearing gap 24 and a part of the equalizing volume cavity 20 are filled with bearing fluid, preferably with a bearing oil-based fluid.

The filling ratio for filling the equalizing volume cavity 20 with fluid is so chosen as to enable for a sufficient amount of lubricant to be introduced into the bearing gap to ensure continuous lubrication of the hydrodynamic bearing over its entire lifespan.

On the other hand, enough space must be left in the filled part of the equalizing volume cavity 20 to enable the bearing fluid to expand into the cavity when the overall volume of the fluid increases after a rise in temperature during operation due to differences in thermal expansion coefficients.

That part of the equalizing volume cavity 20 not filled with bearing fluid will become concentrated with gaseous fluid due to the vaporization rate of the bearing fluid, wherein as the saturation rate increases, the vaporization rate will become increasingly slower.

To the extent that bearing fluid vaporizes into the atmosphere from the bearing gap 24 via its contact surfaces, it is replaced by the bearing fluid found in the equalizing volume cavity 20. A continuous capillary film is maintained by the micro-passage 26 which extends between the bearing gap 24 and the equalizing volume cavity 20.

This arrangement ensures that the bearing gap 24 is fully filled with bearing fluid over its entire lifespan, so that in the hydrodynamic bearing according to the invention "seizure" due to a lack of lubricant as a result of dry running can be excluded.

When the hydrodynamic bearing according to the invention is installed in motors in which the bearing sleeve 12 forms a part of the rotor, i.e. rotates together with the rotor, centrifugal forces induced by rotation, that are brought to bear on the bearing fluid found in the equalizing volume cavity 20 and the micro-passage 26, are essentially in equilibrium. Since the quantity of the bearing fluid held in the equalizing volume cavity 20 is somewhat greater than the quantity of bearing fluid in the micro-passage 26, as a result of centrifugal forces, the bearing fluid in the equalizing volume cavity 20 will tend to be pushed outwards more strongly. This insures that the continuous capillary film of bearing fluid extends without tearing from the bearing gap 24 via the micro-passage 26 into the equalizing volume cavity 20.

In the illustrated embodiment, the shaft 10 and the bearing sleeve 12 can be made of steel and the housing can 18 can be made of aluminum. A person skilled in the art can use other appropriate materials depending on specific requirements.

Figure 2:
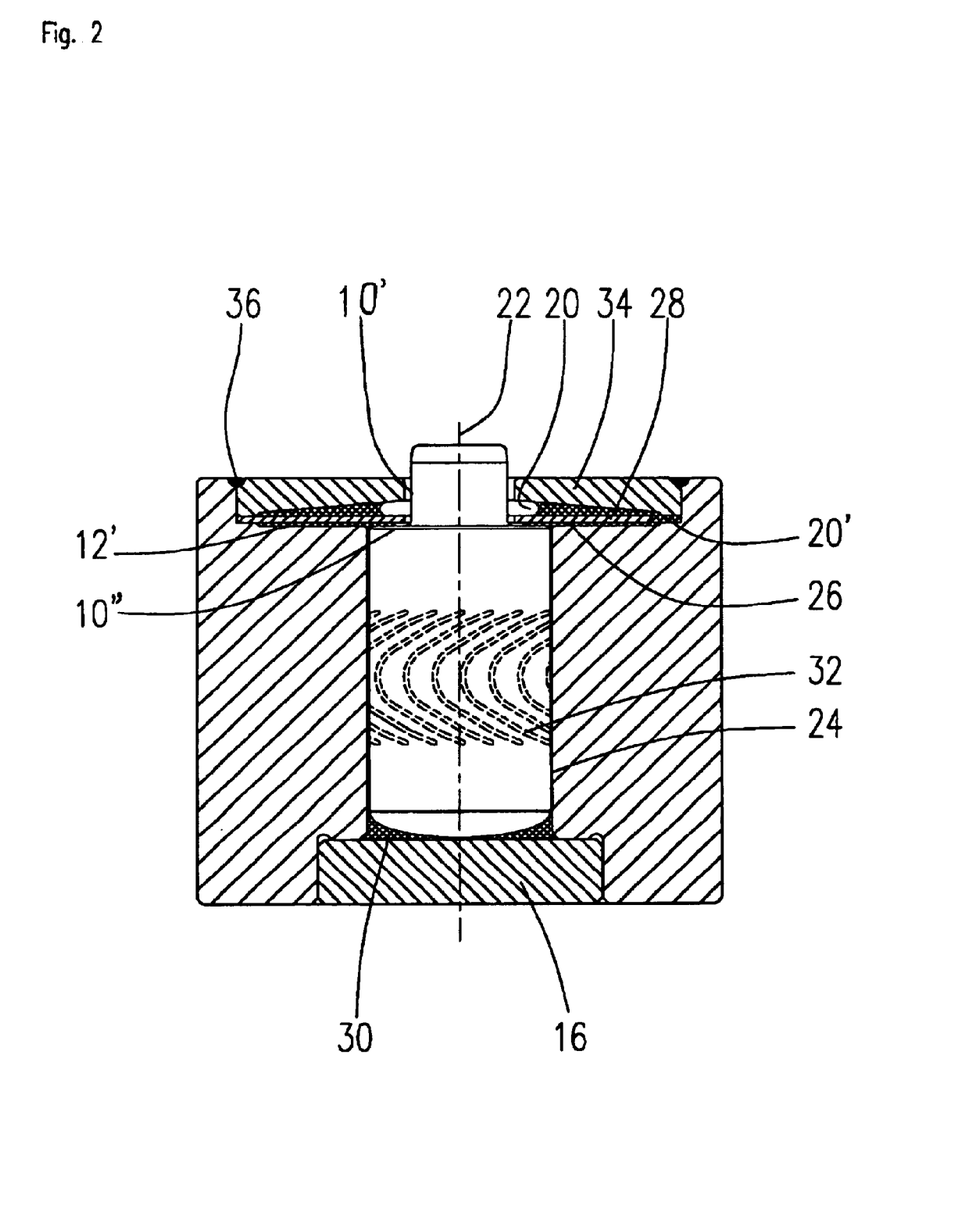
FIG. 2 shows a schematic longitudinal sectional view of a modified embodiment of the hydrodynamic bearing in FIG. 1.

FIG. 2 shows a schematic longitudinal section of a modification of the embodiment of FIG. 1, wherein corresponding parts are denoted with the same identification references. The embodiment in FIG. 2 differs from FIG. 1 in that instead of a hydrodynamic axial bearing, a pivot-type bearing 30 is provided. All functional elements are mounted into the appropriately designed bearing sleeve 12, so that the housing can 18 is no longer required.

The pivot-type bearing 30 in the embodiment shown in FIG. 2 is formed in a manner known in the art. The pivot formed at the end of the shaft 10 is supported on the counter plate 16. In the embodiment of FIG. 2, a shaft 10 with a radial bearing section 32 is illustrated. A person skilled in the art, however, will be aware that all the embodiments of the invention can feature one or more, in particular two, such radial bearing sections in the area of the longitudinal span of the shaft 10 or the bearing sleeve 12.

In the embodiment of FIG. 2, the micro-passage 26 connecting the bearing gap 24 via the opening 20' with the equalizing volume cavity 20 is formed between the depression on the end face 12' of the bearing sleeve 12 and an annular disk 28. The annular disk 28 features recesses along its perimeter which form openings 20', as indicated in FIG. 2 to the right of the rotational axis 22 through the radial shortening of the annular disk 28.

The top end 12' of the bearing sleeve 12 is formed in the embodiment of FIG. 2 such that it can accommodate a cover plate 34. Cover plate 34 is fitted into an appropriate recess in the end 12' of the bearing sleeve 12 and then sealed together with the sleeve using welding, bonding, screwing or any other appropriate way to form a secure, air-tight seal. FIG. 2, for example, shows a weld 36 used to attach the cover plate 34 to the bearing sleeve 12. The cover plate 34 is provided with a chamfer or a countersink, so that a tapered equalizing volume cavity 20 is formed between the chamfer and the annular disk 38. Tapered equalizing volume cavity 20 widens radially inwards in the direction of the shaft 10.

The embodiment of FIG. 2 also differs from that of FIG. 1 in that the shaft 10 features a shoulder 10" at its "free" end 10' which is overlapped by an inner rim of the annular disk 28 and the cover plate 34. This gives shaft 10 a mechanical protection against axial shift and ensures that no bearing fluid will be splashed out of the bearing gap 24 in the axial direction if the hydrodynamic bearing is exposed to shock.

FIGS. 1 and 2 illustrate the bearing sleeve 12 for hydrodynamic bearings which are sealed at one end are the shaft 10 protrudes from the bearing sleeve only at one end, i.e., the free end 10'.

Figure 3:
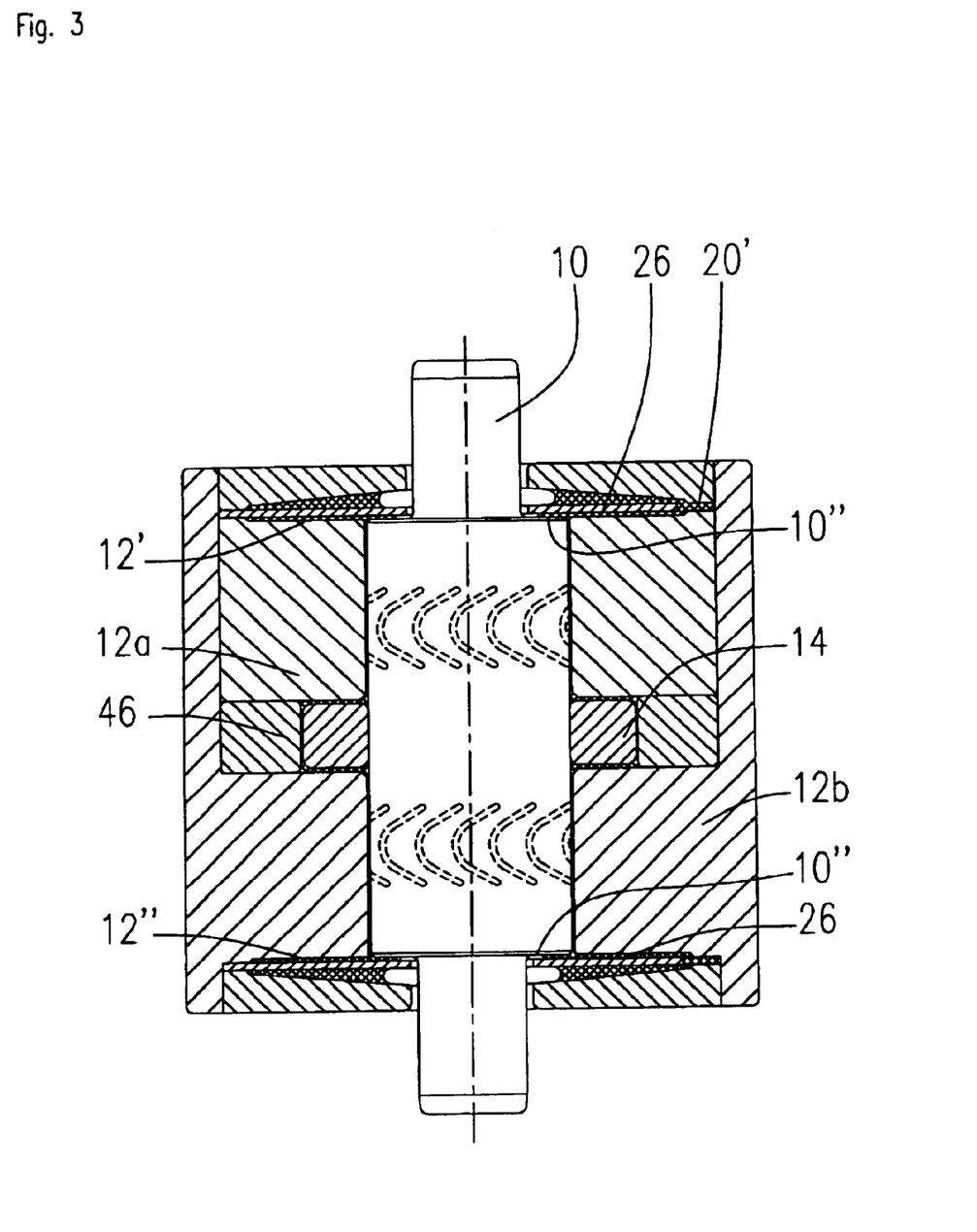
FIG. 3 shows a schematic longitudinal sectional view of a further embodiment of the hydrodynamic bearing according to the invention.
Figure 4:
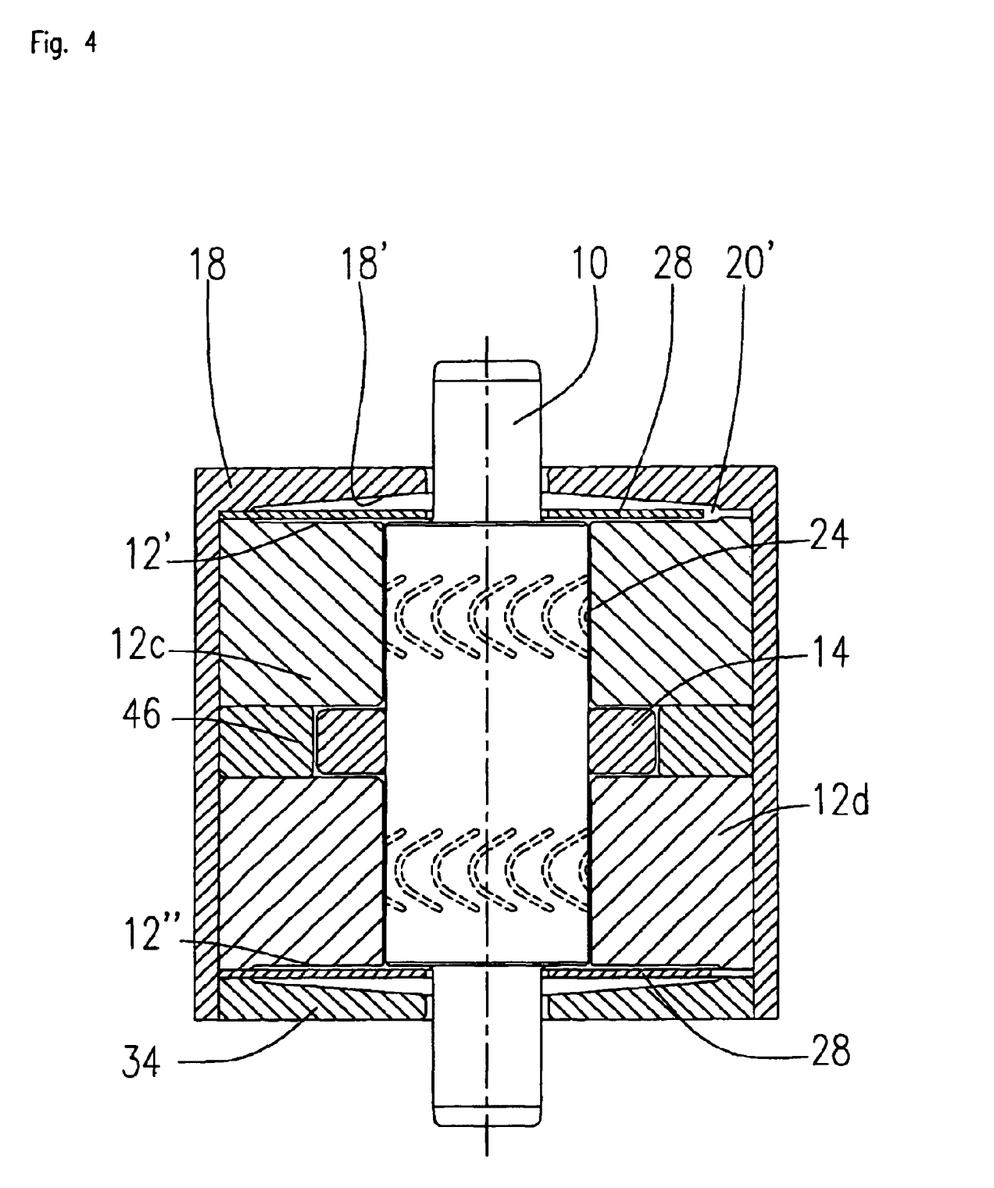
FIG. 4 shows a schematic longitudinal sectional view of a modified embodiment of the hydrodynamic bearing in FIG. 3.
Figure 5:
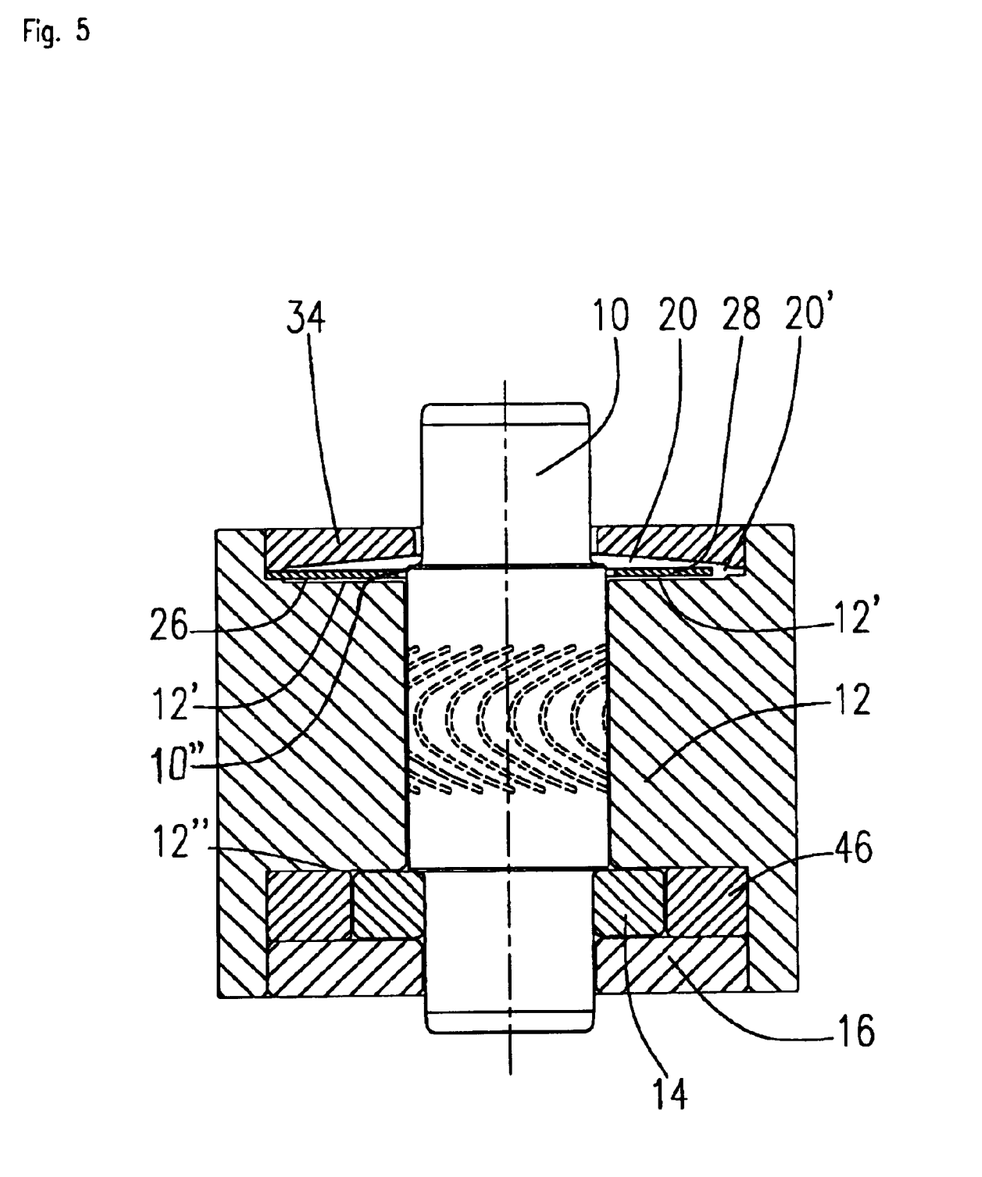
FIG. 5 shows a schematic longitudinal sectional view of a further embodiment of the hydrodynamic bearings according to the invention.

The embodiments in FIGS. 3–5 refer to bearing sleeves with two open ends and feature at least one equalizing volume cavity provided in accordance with the present invention. Where required, two equalizing volume cavities can also be provided.

FIG. 3 shows an embodiment of the bearing according to the invention with a bearing sleeve open at both ends. The hydrodynamic bearing according to the invention shown in FIG. 3 includes a stepped shaft 10 with shoulders 10" formed in close proximity to sleeve ends 12' and 12". The shaft 10 features a central thrust plate 14 to form an axial bearing. The bearing sleeve is preferably formed as a two-parts element having an external sleeve section 12b and an internal sleeve section 12a. The internal sleeve section 12a is set into an appropriate recess in the external sleeve section 12b, as shown in FIG. 3. A spacer ring 46 is set in the area of the thrust plate 14, between the external and internal bearing sleeve section 12a and 12b. Spacer ring 46 allows for an adjustment of the bearing gap 24 in the area of the thrust plate 14. The thrust plate 14 is supported on the bearing sleeve sections 12a, 12b, so that it can also take on the function of an axial counter plate.

The internal sleeve section 12a can be fitted, pressed, bonded or welded into the external sleeve section 12b or connected to it in any other way.

The micro-passage 26 and the equalizing volume cavity 20 are formed at the respective ends 12', 12" of the internal sleeve section 12a or the external sleeve section 12b in the same manner as described with reference to FIG. 2.

FIG. 4 shows a similar embodiment as in FIG. 3. It differs from the embodiment in FIG. 3 by the two-piece construction of the bearing sleeve with two bearing sleeve sections 12c, 12d being mirror-symmetric in an axial direction and separated by a spacer ring 46 as shown in FIG. 4. As in the embodiment of FIG. 1, the axial bearing sleeve sections 12c, 12d and the spacer ring 46 are set, particularly pressed or shrunk, into a housing can 18. The spacer ring 46 again has the function of adjusting the bearing gap 24 in the area of the thrust plate 14, i.e. the axial bearing.

The micro-passage 26 and the equalizing volume cavity 20 are formed at each open end of the housing can 18, in a similar way as in FIGS. 1 and 3. An annular disk 28 and a cover plate 34 are inserted adjoining the end 12" of the bearing sleeve section 12d. At the opposing end 12' of the bearing sleeve section 12c, the micro-passage 26 and the equalizing volume cavity 20 are formed between the end 12' of the bearing sleeve section 12c, the annular disk 28 and the bottom 18' of the cup 18.

FIG. 4 shows an embodiment of the hydrodynamic bearing with a thrust plate 14 arranged centrally along the longitudinal axis of the bearing which, together with the corresponding end surfaces of the bearing sleeves 12c and 12d, form two hydrodynamic axial bearings operating in opposite directions. A person skilled in the art will appreciate that the axial bearing formed in the area of the thrust plate 14 can be moved up or down, depending on the application, along the rotational axis 22. Moreover, FIG. 4 shows an embodiment in which the can 18 encases the bearing sleeve 12c, 12d along its entire length. A person skilled in the art will appreciate that a similar function can also be achieved with a can which has a shorter length than the length of the bearing sleeve. The housing can 18 can be manufactured using injection molding, turning or by deep-drawing as in FIG. 1, or in any other appropriate way. The bearing sleeve sections 12c, 12d are held in the housing can 18 preferably by press fitting.

FIG. 5 shows a further embodiment of the hydrodynamic bearing according to the invention. The embodiment in FIG. 5 includes a stepped shaft 10 with a shoulder 10" and a thrust plate 14. The shaft 10 is held in a bearing sleeve 12, which at one of its ends 12" features a recess to accommodate a spacer ring 46 and a counter plate 16. At this end 12", a hydrodynamic axial bearing is formed between the thrust plate 14 and counter plate 16. At the opposing end 12', as described, for example, with reference to FIG. 2, a micro-passage 26 and an equalizing volume cavity 20 are formed for the bearing fluid by means of an annular disk 28 and a cover plate 34. The embodiment in FIG. 5 differs from the embodiment in FIG. 2 in that only the cover plate 34 laps over the shaft shoulder 10" in order to prevent bearing fluid from being splashed out when exposed to shock. With regard to the various embodiments described above of the hydrodynamic bearing according to the invention, a person skilled in the art will be able to conceive further modifications of the bearing, with a bearing sleeve having one sealed end or two open ends, with or without the can, with a different realization for the micro-passage and the equalizing volume cavity, with a different arrangement and design of the axial and radial bearing sections as well as numerous other modifications.

Figure 6A:
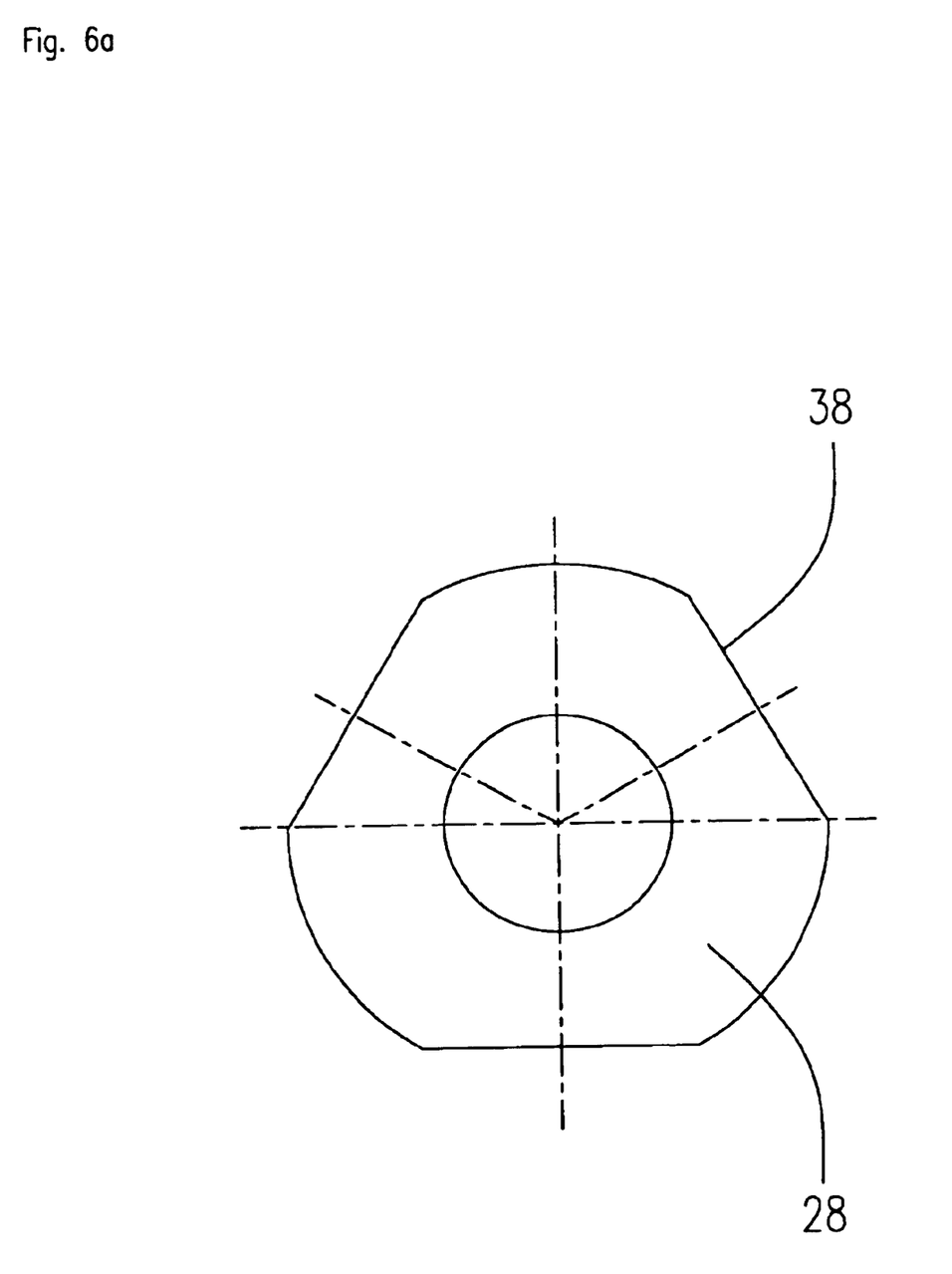
FIG. 6a shows a view from above of an annular disk for use in a hydrodynamic bearing according to the invention.
Figure 6B:
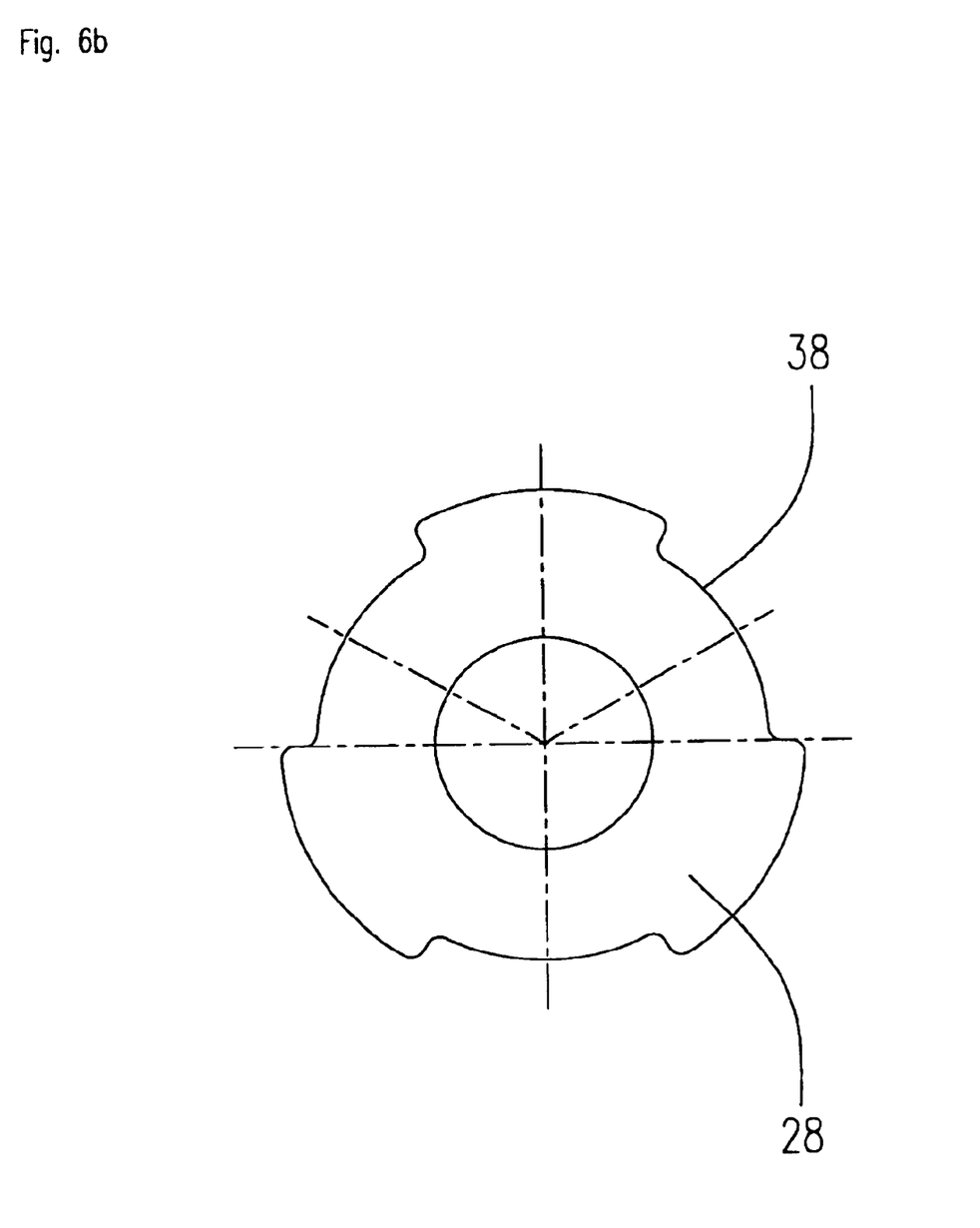

FIGS. 6a and 6b show two possible embodiments of the annular disk 28 to enclose the micro-passage 26 between the end 12' of the bearing sleeve and the annular disk 28. An identifying characteristic of the embodiment of the annular disk 28 shown is that it features recesses 38 on its outer perimeter which, when the disk is mounted, form openings 20' accomplishing the connection between micro-passages 26 and corresponding equalizing volume cavities 20 (as shown in FIGS. 1 through 5). This, of course, can also be effected by giving the rim area a different shape or through bores, preferably in the outer rim area of the annular disk 28. The annular disk 28 can be made for example by punching or injection molding.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

I claim as follows:

1. A hydrodynamic bearing comprising:
   a shaft;
   a bearing sleeve encompassing the shaft;
   a concentric bearing gap formed between the shaft and the bearing sleeve;
   an equalizing volume cavity having an opening,
   at least one connecting passage connecting the bearing gap with the equalizing volume cavity via the opening; and
   an annular disk set parallel to one end of the bearing sleeve, wherein the connecting passage is formed between said one end of the bearing sleeve and the annular disk,
   wherein the opening of the equalizing volume cavity is distanced radially away from the bearing gap.

2. The hydrodynamic bearing according to claim 1, wherein the connecting passage directly or indirectly adjoins the bearing gap.

3. The hydrodynamic bearing according to claim 1, wherein the connecting passage directly or indirectly adjoins a radial bearing section formed by a plurality of grooves provided on at least one of the shaft and the bearing sleeve.

4. The hydrodynamic bearing according to claim 1, wherein at least one radial bearing is formed in the area of the bearing gap, and wherein the connecting passage is connected with the radial bearing via a section of the bearing gap.

5. The hydrodynamic bearing according to claim 1, further comprising a bearing fluid completely filling the bearing gap and the connecting passage and at least partially filling the equalizing volume cavity, wherein the bearing fluid forms a continuous capillary film between the bearing gap and the equalizing volume cavity.

6. The hydrodynamic bearing according to claim 1, wherein the connecting passage is a least partly formed within the bearing sleeve.

7. The hydrodynamic bearing according to claim 1, wherein the connecting passage encloses a circumferential capillary annular gap adjoining an inner diameter of the bearing sleeve.

8. The hydrodynamic bearing according to claim 1, wherein the annular disk further comprises at least one recess along its perimeter creating a fluid connection between the connecting passage and the equalizing volume cavity.

9. The hydrodynamic bearing according to claim 1 further comprising a cap set at said one end of the bearing sleeve, wherein the equalizing volume cavity is formed between the annular disk and the cap.

10. The hydrodynamic bearing according to claim 1, wherein the connecting passage extends at an angle of approximately 90 degrees to a rotational axis of the hydrodynamic bearing.

11. The hydrodynamic bearing according to claim 1, wherein the equalizing volume cavity is formed as a tapered cavity whose base is connected with the bearing gap via the opening and the connecting passage.

12. The hydrodynamic bearing according to claim 1, wherein the equalizing volume cavity extends substantially perpendicular to a rotational axis of the hydrodynamic bearing gradually widening at a cavity end facing the bearing gap.

13. The hydrodynamic bearing according to claim 1 further comprising a cover plate, wherein the shaft further comprises a shoulder located in close proximity to one end of the bearing sleeve and wherein the shoulder at least partially overlaps the cover plate.

14. The hydrodynamic bearing according to claim 1, wherein the shaft further comprises a shoulder located in close proximity to said one end of the bearing sleeve and wherein the shoulder at least partially overlaps the annular disk.

15. A spindle motor having a hydrodynamic bearing, the hydrodynamic bearing comprising:
   a shaft;
   a bearing sleeve encompassing the shaft;
   a concentric bearing gap formed between the shaft and the bearing sleeve;
   an equalizing volume cavity having an opening,
   at least one connecting passage connecting the bearing gap with the equalizing volume cavity via the opening; and
   an annular disk set parallel to one end of the bearing sleeve, wherein the connecting passage is formed between said one end of the bearing sleeve and the annular disk,
   wherein the opening of the equalizing volume cavity is distanced radially away from the bearing gap.

16. A hard disk drive with a spindle motor having a hydrodynamic bearing, the hydrodynamic bearing comprising:
   a shaft;
   a bearing sleeve encompassing the shaft;
   a concentric bearing gap formed between the shaft and the bearing sleeve;
   an equalizing volume cavity having an opening,
   at least one connecting passage connecting the bearing gap with the equalizing volume cavity via the opening; and
   an annular disk set parallel to one end of the bearing sleeve, wherein the connecting passage is formed between said one end of the bearing sleeve and the annular disk,
   wherein the opening of the equalizing volume cavity is distanced radially away from the bearing gap.

* * * * *